United States Patent
Nishioka et al.

(10) Patent No.: US 9,777,086 B2
(45) Date of Patent: Oct. 3, 2017

(54) POLYMERIZABLE COMPOSITION AND METHOD OF PRODUCTION OF RESIN SHAPED ARTICLE

(71) Applicant: RIMTEC CORPORATION, Tokyo (JP)

(72) Inventors: Naoki Nishioka, Tokyo (JP); Nobuto Kamei, Tokyo (JP)

(73) Assignee: RIMTEC CORPORATION, Tokyo (JP)

( * ) Notice: Subject to any disclaimer, the term of this patent is extended or adjusted under 35 U.S.C. 154(b) by 0 days.

(21) Appl. No.: 14/431,150

(22) PCT Filed: Sep. 25, 2013

(86) PCT No.: PCT/JP2013/075914
§ 371 (c)(1),
(2) Date: Mar. 25, 2015

(87) PCT Pub. No.: WO2014/050890
PCT Pub. Date: Apr. 3, 2014

(65) Prior Publication Data
US 2015/0240007 A1  Aug. 27, 2015

(30) Foreign Application Priority Data
Sep. 26, 2012  (JP) ................. 2012-211745

(51) Int. Cl.
| | | |
|---|---|---|
| *C08G 61/08* | (2006.01) | |
| *C08F 132/08* | (2006.01) | |
| *C09D 165/00* | (2006.01) | |
| *C08L 65/00* | (2006.01) | |

(52) U.S. Cl.
CPC ............ *C08F 132/08* (2013.01); *C08G 61/08* (2013.01); *C08L 65/00* (2013.01); *C09D 165/00* (2013.01); *C08G 2261/3324* (2013.01); *C08G 2261/418* (2013.01); *C08G 2261/59* (2013.01)

(58) Field of Classification Search
CPC ........ B01J 21/28; B01J 31/28; B01J 31/2278; C08G 61/08; C08G 61/06
See application file for complete search history.

(56) References Cited

U.S. PATENT DOCUMENTS

| | | | |
|---|---|---|---|
| 5,266,665 A * | 11/1993 | Hardiman .............. | C08G 61/08 428/403 |
| 5,606,085 A | 2/1997 | Bell et al. | |
| 5,639,900 A | 6/1997 | Bell et al. | |
| 6,310,121 B1 | 10/2001 | Woodson, Jr. et al. | |
| 6,759,537 B2 * | 7/2004 | Grubbs ................. | B01J 31/181 502/155 |
| 8,338,613 B2 * | 12/2012 | Drozdzak ........... | C07F 15/0046 548/103 |
| 8,487,046 B2 * | 7/2013 | Recher .................. | C08G 61/08 525/210 |
| 8,519,069 B2 * | 8/2013 | Drozdzak ............. | C07F 15/002 502/155 |
| 8,703,888 B2 * | 4/2014 | Drozdzak ........... | B01J 31/2217 502/155 |
| 8,927,670 B2 * | 1/2015 | Schaubroeck ....... | B01J 31/2273 502/150 |
| 2011/0097568 A1 | 4/2011 | Kamae et al. | |

FOREIGN PATENT DOCUMENTS

| | | | | |
|---|---|---|---|---|
| CN | 103180387 A | | 6/2013 | |
| JP | 05-329868 A | | 12/1993 | |
| JP | 7-292079 A | | 11/1995 | |
| JP | 2002-121266 A | * | 4/2002 | ............ C08G 61/08 |
| JP | 2002-201258 A | | 7/2002 | |
| JP | 2009-29865 A | | 2/2009 | |
| JP | 2009-263469 A | * | 11/2009 | ............ C08G 61/06 |
| JP | 2013-76007 A | * | 4/2013 | ............ C08G 61/08 |
| WO | 91/18938 A1 | | 12/1991 | |
| WO | 03/000764 A2 | | 1/2003 | |
| WO | 2009/119467 A1 | | 10/2009 | |
| WO | 2012/063579 A1 | | 5/2012 | |

OTHER PUBLICATIONS

US 5,502,228, 03/1996, Bell et al. (withdrawn)
Pasto, D.J.and Johnson C.R. "Cooling Devices" Laboratory Text for Organic Chemistry, Prentice-Hall, Inc.: Englewood Cliffs, NJ 1979, p. 14.*
Drozdzak, R.; Nishioka, N.; Recher, G., Verpoort, F. Macromol. Symp. 2010, 293, 1-4.*
International Search Report dated Dec. 3, 2013, issued in corresponding application No. PCT/JP2013/075914.

(Continued)

*Primary Examiner* — Rip A Lee
(74) *Attorney, Agent, or Firm* — Westerman, Hattori, Daniels & Adrian, LLP

(57) ABSTRACT

A polymerizable composition comprised of a mixture of a norbornene-based monomer and a metathesis polymerization catalyst which is solidified by cooling is provided. Preferably, the norbornene-based monomer has a freezing point of 20° C. or more, more preferably the metathesis polymerization catalyst is a ruthenium-carbene complex. According to the present invention, it is possible to provide a polymerizable composition which is excellent in storage stability and which enables industrial production of small resin shaped articles which are excellent in stability of quality.

5 Claims, No Drawings

(56) References Cited

OTHER PUBLICATIONS

Extended European Search Report dated Feb. 5, 2016, issued in counterpart European Patent Application No. 13841272.1.
Database WPI, Week 201330, Thomson Scientific, AN 2013-G13929 & JP 2013-076007, Apr. 25, 2013.
Chen, Fengxiang et al., "Functionalization of 7-oxanorbomene and its ring-opening metathesis polymerization", Acta Polymerica Sinica, No. 4, Shanghai, Apr. 2007, with English translation, pp. 383-388.
Office Action dated Dec. 2, 2015, issued in counterpart Chinese Patent Application No. 201380045698.2, with English translation (13 pages).

* cited by examiner

POLYMERIZABLE COMPOSITION AND METHOD OF PRODUCTION OF RESIN SHAPED ARTICLE

TECHNICAL FIELD

The present invention relates to a polymerizable composition which is excellent in storage stability and which enables the industrial production of a small resin shaped article which is excellent in stability of quality and a method of production of a resin shaped article which uses that polymerizable composition.

BACKGROUND ART

A norbornene-based polymer which is obtained by polymerization of a polymerizable monomer which contains a norbornene-based monomer in the presence of a metathesis polymerization catalyst is excellent in electrical characteristics, mechanical characteristics, impact resistance, heat resistance, weather resistance, etc., so is being increasingly used in a broad range of fields of shaped articles.

Such a norbornene-based polymer is, for example, produced by the reaction injection molding method of charging a reaction solution which includes a polymerizable monomer which includes a norbornene-based monomer and a metathesis polymerization catalyst in a mold and causing bulk polymerization.

However, a norbornene-based monomer is high in reactivity with respect to a metathesis polymerization catalyst, so the inconvenience ends up arising that if mixing these in advance, a polymerization reaction ends up proceeding and a good shaped article cannot be obtained. Accordingly, to prevent such an inconvenience from arising, when using the reaction injection molding method etc. to obtain a norbornene-based polymer, the monomer solution which contains the norbornene-based monomer and the catalyst solution which contains the metathesis polymerization catalyst have had to be separately prepared and the separately prepared monomer solution and catalyst solution have had to be made to instantaneously mix by an collisional mixing device etc. right before being charged into the shaping mold.

Further, in such a reaction injection molding method, since the method of mixing the monomer solution and catalyst solution right before charging them into the shaping mold is employed, when producing a relatively large shaped article, a good shaped article is obtained, but when trying to obtain a small shaped article (for example, a shaped article with a weight of less than 100 g), if using the monomer solution and the catalyst solution in large amounts in order to increase the mixing ability of the monomer solution and the catalyst solution, the material loss becomes excessive, while with small amounts, the mixability becomes insufficient and resultant parts with insufficient curing end up locally present and a good shaped article cannot be obtained.

On the other hand, Patent Document 1 discloses a polymerization method which improves the polymerization stability by adding a retardant etc. when polymerizing a mixture which contains a norbornene-based monomer and metathesis polymerization catalyst so as to set the gel time of the mixture at 15 seconds or more. Here, the gel time in Patent Document 1 means the so-called "gelation time" from when the metathesis polymerization catalyst is added to the monomer solution which contains the norbornene-based monomer to when the norbornene-based monomer reacts and gelates due to the action of the metathesis polymerization catalyst.

PRIOR ART DOCUMENTS

Patent Documents

Patent Document 1: Japanese Patent Publication No. 2002-121266A

DISCLOSURE OF THE INVENTION

Problem to be Solved by the Invention

However, the inventors engaged in studies and learned that with the method of the above Patent Document 1, the time until the norbornene-based monomer reacts and gelates can be lengthened to a certain extent, but when industrially producing a small resin shaped article (for example, a resin shaped article with a weight of less than 100 g), while sufficient mixability of the monomer solution and the catalyst solution can be secured, the material loss still cannot be sufficiently suppressed and that production of the resin shaped article on an industrial scale is extremely difficult.

The present invention has as its object the provision of a polymerizable composition which is excellent in storage stability and which enables industrial production of a small resin shaped article (for example, a resin shaped article with a weight of less than 100 g) which is excellent in stability of quality and a method of production of a resin shaped article which uses that polymerizable composition.

Means for Solving the Problems

The inventors engaged in intensive research to achieve the above object and as result discovered that the above object can be achieved by a polymerizable composition which is obtained by solidification by cooling of a mixture which contains a norbornene-based monomer and a metathesis polymerization catalyst and thereby completed the present invention.

That is, according to the present invention, there are provided

[1] A polymerizable composition comprised of a mixture of a norbornene-based monomer and a metathesis polymerization catalyst which is solidified by cooling,

[2] The polymerizable composition as set forth in [1] wherein the norbornene-based monomer has a freezing point of 20° C. or more,

[3] The polymerizable composition as set forth in [1] or [2] wherein the metathesis polymerization catalyst is a ruthenium-carbene complex,

[4] The polymerizable composition as set forth in [3] wherein the ruthenium-carbene complex is a compound represented by the following general formula (1) or (2):

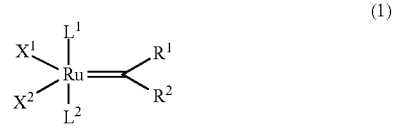

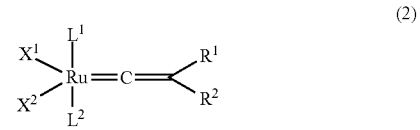

(in which general formulas (1) and (2), $R^1$ and $R^2$ respectively independently indicate a hydrogen atom, halogen atom, or $C_1$ to $C_{20}$ organic group which may contain a halogen atom, oxygen atom, nitrogen atom, sulfur atom, phosphorus atom, or silicon atom, where these groups may be substituted and, further, may be bonded together to form rings; $X^1$ and $X^2$ respectively independently indicate anionic ligands; $L^1$ and $L^2$ indicate hetero atom-containing carbene compounds or neutral electron donor compounds other than hetero atom-containing carbene compounds; $R^1$, $R^2$, $X^1$, $X^2$, $L^1$, and $L^2$ may respectively independently and/or in any combination bond together to form multi-dendate chelate ligands),

[5] The polymerizable composition as set forth in any one of [1] to [4] wherein a cooling temperature at the time of the solidification by cooling is made to be a temperature of 20° C. or more lower than a freezing point of the norbornene-based monomer, and

[6] A method of production of a resin shaped article comprising a step of bulk polymerizing the polymerizable composition as set forth in any one of [1] to [5].

Effects of the Invention

According to the present invention, it is possible to obtain a polymerizable composition which is excellent in storage stability and which enables industrial production of a small resin shaped article (for example, a resin shaped article with a weight of less than 100 g) which is excellent in stability of quality and a method of production of a resin shaped article which uses the polymerizable composition.

DESCRIPTION OF EMBODIMENTS

The polymerizable composition of the present invention is a polymerizable composition which is obtained by solidification by cooing of a mixture which contains a norbornene-based monomer and a metathesis polymerization catalyst (mixture for a polymerizable composition).

(Norbornene-Based Monomer)

The norbornene-based monomer is not particularly limited so long as a compound which has a norbornene ring structure, but norbornene, norbornadiene, or other bicyclic structure; dicyclopentadiene (cyclopentadiene dimer), dihydrodicyclopentadiene or other tricyclic structure; tetracyclododecene or other tetracyclic structure; cyclopentadiene trimer or other pentacyclic structure; cyclopentadiene tetramer or other heptacyclic structure; etc. may be mentioned.

These norbornene-based monomers may be substituted by methyl group, ethyl group, propyl group, butyl group, or other alkyl groups; vinyl group or other alkenyl groups; ethylidene group or other alkylidene groups; phenyl group, tolyl group, naphthyl group or other aryl groups; etc. Further, these norbornene-based monomers may have carboxyl group, alkoxycarbonyl group, acyloxy group, oxy group, cyano group, halogen atom, or other polar groups.

As specific examples of such norbornene-based monomers, dicyclopentadiene, tricyclopentadiene, cyclopentadiene-methylcyclopentadiene codimer, 5-ethylidene norbornene, norbornene, norbornadiene, 5-cyclohexenyl norbornene, 1,4,5,8-dimethano-1,4,4a,5,6,7,8,8a-octaydronaphthalene, 1,4-methano-1,4,4a,5,6,7,8,8a-octahydronaphthalene, 6-ethylidene-1,4,5,8-dimethano-1,4,4a,5,6,7,8,8a-octahydronaphthalene, 6-ethylidene-1,4-methano-1,4,4a,5,6,7,8,8a-octahydronaphthalene, 1,4,5,8-dimethano-1,4,4a,5,6,7,8,8a-hexahydronaphthalene, ethylene bis(5-norbornene), etc. may be mentioned.

The norbornene-based monomers may be used as single types alone or as two types or more in combination.

In the present invention, among the above norbornene-based monomers, due to the ease of handling at room temperature, ones with a freezing point of 20° C. or more are preferable, ones with a freezing point of 28° C. or more are more preferable, and ones with a freezing point of 35° C. or more are furtehrmore preferable. Among these, from the viewpoints of the ease of acquisition, excellent reactivity, and that the obtained shaped article is to be excellent in heat resistance, dicyclopentadiene (freezing point 31° C.) and tricyclopentadiene (freezing point 68° C.) are preferable and dicyclopentadiene is particularly preferable.

Note that, within a range not detracting from the object of the present invention, a monocyclic cycloolefin which can copolymerize with a norbornene-based monomer by ring-opening copolymerization such as cyclobutene, cyclopentene, cyclopentadiene, cyclooctene, or cyclododecene may be used as a comonomer.

(Metathesis Polymerization Catalyst)

A metathesis polymerization catalyst is a complex which has a transition metal atom as its center atom around which a plurality of ions, atoms, polyatomic ions, and/or compounds are bonded. As the transition metal atoms, atoms of the Group V, VI, and VIII (Long Periodic Table, same below) are used. The atoms of these groups are not particularly limited, but as atoms of Group V, for example, tantalum may be mentioned, as atoms of Group VI, for example molybdenum or tungsten may be mentioned, and as atoms of Group VIII, for example, ruthenium or osmium may be mentioned. Among these transition metal atoms as well, ruthenium or osmium of Group VIII is preferable. That is, as the metathesis polymerization catalyst which is used in the present invention, a complex which has ruthenium or osmium as its center atom is preferable, while a complex which has ruthenium as its center atom is more preferable. As the complex which has ruthenium as its center atom, a ruthenium-carbene complex comprised of a carbene compound coordinated at ruthenium is preferable. Here, a "carbene compound" is the general name for a compound which has a methylene free group and is a compound which has a bivalent carbon atom (carbene carbon) with no charge such as represented by (>C:). A ruthenium-carbene complex is excellent in catalyst activity at the time of bulk polymerization, so when using the polymerizable composition of the present invention for bulk polymerization to obtain a shaped article, the obtained shaped article will have little odor derived from unreacted monomer and a good quality shaped article can be obtained with good productivity. Further, this is relatively stable even with respect to oxygen or the moisture in the air and is resistant to deactivation, so can be used even in an air atmosphere.

As the ruthenium-carbene complex, one of the general formula (1) or general formula (2) may be mentioned.

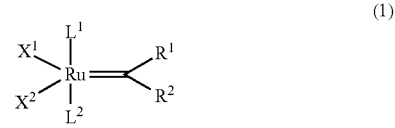

(1)

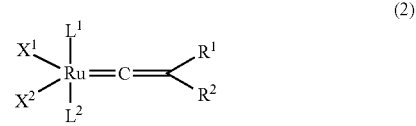

(2)

In the general formulas (1) and (2), $R^1$ and $R^2$ respectively independently indicate a hydrogen atom; halogen atom; or $C_1$ to $C_{20}$ organic group which may contain a halogen atom, oxygen atom, nitrogen atom, sulfur atom, phosphorus atom or silicon atom, where these groups may be substituted and, further, may bond together to form rings. As examples where $R^1$ and $R^2$ bond together to form rings, a phenylindenylidene group or other indenylidene group which may be substituted may be mentioned.

As specific examples of the $C_1$ to $C_{20}$ organic group which may contain a halogen atom, oxygen atom, nitrogen atom, sulfur atom, phosphorus atom, or silicon atom, a $C_1$ to $C_{20}$ alkyl group, $C_2$ to $C_{20}$ alkenyl group, $C_2$ to $C_{20}$ alkynyl group, $C_6$ to $C_{20}$ aryl group, $C_1$ to $C_{20}$ alkoxy group, $C_2$ to $C_{20}$ alkenyloxy group, $C_2$ to $C_{20}$ alkenyloxy group, $C_6$ to $C_{20}$ aryloxy group, $C_1$ to $C_8$ alkylthio group, carbonyloxy group, $C_1$ to $C_{20}$ alkoxycarbonyl group, $C_1$ to $C_{20}$ alkylsulfonyl group, $C_1$ to $C_{20}$ alkylsulfinyl group, $C_1$ to $C_{20}$ alkylsulfonic acid group, $C_6$ to $C_{20}$ arylsulfonic acid group, phosphonic acid group, $C_6$ to $C_{20}$ arylphosphonic acid group, $C_1$ to $C_{20}$ alkylammonium group, $C_6$ to $C_{20}$ arylammonium group, etc. may be mentioned. These $C_1$ to $C_{20}$ organic groups which may contain a halogen atom, oxygen atom, nitrogen atom, sulfur atom, phosphorus atom, or silicon atom may be substituted. As examples of the substituent, a $C_1$ to $C_{10}$ alkyl group, $C_1$ to $C_{10}$ alkoxy group, $C_6$ to $C_{10}$ aryl group, etc. may be mentioned.

$X^1$ and $X^2$ respectively independently indicate any anionic ligand. An "anionic ligand" is a ligand which has a negative charge when separated from the center metal atom. For example, a halogen atom, diketonate group, substituted cyclopentadienyl group, alkoxyl group, aryloxy group, carboxyl group, etc. may be mentioned.

$L^1$ and $L^2$ indicate a hetero atom-containing carbene compound or a neutral electron donor compound other than a hetero atom-containing carbene compound. The hetero atom-containing carbene compound and neutral electron donor compound other than a hetero atom-containing carbene compound are compounds which have neutral charges when separated from the center metal. From the viewpoint of improvement of the catalyst activity, a hetero atom-containing carbene compound is preferable. A "hetero atom" means an atom of Group XV and Group XVI of the Periodic Table. Specifically, a nitrogen atom, oxygen atom, phosphorus atom, sulfur atom, arsenic atom, selenium atom, etc. may be mentioned. Among these, from the viewpoint of a stable carbene compound being obtained, a nitrogen atom, oxygen atom, phosphorus atom, and sulfur atom are preferable and a nitrogen atom is particularly preferable.

As the hetero atom-containing carbene compound, a compound of the following general formula (3) or (4) is preferable. From the viewpoint of improvement of the catalyst activity, a compound of the following general formula (3) is particularly preferable.

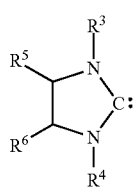

(3)

-continued

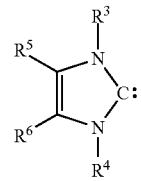

(4)

where in the general formulas (3) and (4), $R^3$, $R^1$, $R^5$, and $R^6$ respectively independently indicate a hydrogen atom; halogen atom; $C_1$ to $C_{20}$ organic group which may contain a halogen atom, oxygen atom, nitrogen atom, sulfur atom, phosphorus atom, or silicon atom. The specific examples of the $C_1$ to $C_{20}$ organic group which may contain a halogen atom, oxygen atom, nitrogen atom, sulfur atom, phosphorus atom, or silicon atom are the same as the case of the general formulas (1) and (2).

Further, $R^3$, $R^4$, $R^5$, and $R^6$ may bond together in any combination to form rings.

Note that, since the effects of the present invention become much more remarkable, $R^5$ and $R^6$ are preferably hydrogen atoms. Further, $R^3$ and $R^4$ are preferably aryl groups which may be substituted. As the substituent, a phenyl group which has a $C_1$ to $C_{10}$ alkyl group is more preferable and a mesityl group is particularly preferable.

As the neutral electron donor compounds, for example, an oxygen atom, water, carbonyls, ethers, nitriles, esters, phosphines, phosphinites, phosphites, sulfoxides, thioesters, amides, imines, aromatics, cyclic diolefins, olefins, isocyanides, thiocyanates, etc. may be mentioned.

In the general formulas (1) and (2), $R^1$, $R^2$, $X^1$, $X^2$, $L^1$, and $L^2$ may respectively independently and/or in any combination bond together to form multi-dendate chelate ligands.

Further, as the ruthenium-carbene complex which is used in the present invention, among the compounds represented by the general formula (1) or (2), from the viewpoint of the action and effect of the present invention becoming more remarkable, compounds represented by the general formula (1) are preferable. Among these as well, compounds represented by the general formula (5) or general formula (6) shown below are more preferable.

The general formula (5) is shown below.

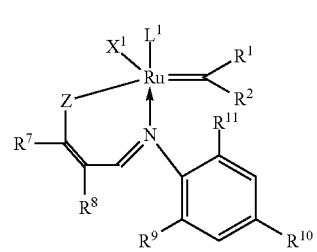

(5)

In the general formula (5), Z indicates an oxygen atom, sulfur atom, selenium atom, $NR^{12}$, $PR^{12}$, or $AsR^{12}$, $R^{12}$ indicates a hydrogen atom; halogen atom; or $C_1$ to $C_{20}$ organic group which may contain a halogen atom, oxygen atom, nitrogen atom, sulfur atom, phosphorus atom, or silicon atom, but since the effect of the present invention becomes much more remarkable, as Z, an oxygen atom is preferable.

Note that, $R^1$, $R^2$, $X^1$, and $L^1$ are the same as those in the cases of the general formulas (1) and (2) and may respectively independently and/or in any combination bond together to form multi-dendate chelate ligands, but preferably $X^1$ and $L^1$ do not form multi-dendate chelate ligands and $R^1$ and $R^2$ bond together to form a ring. More preferably $R^1$ and $R^2$ bond together to form an indenylidene group which may be substituted, particularly preferably a phenylindenylidene group.

Further, the specific examples of a $C_1$ to $C_{20}$ organic group which may contain a halogen atom, oxygen atom, nitrogen atom, sulfur atom, phosphorus atom, or silicon atom are the same as the case of the general formulas (1) and (2).

In the general formula (5), $R^7$ and $R^8$ respectively independently indicate a hydrogen atom, $C_1$ to $C_{20}$ alkyl group, $C_2$ to $C_{20}$ alkenyl group, or $C_6$ to $C_{20}$ heteroaryl group. These groups may be substituted and, further, may bond together to form rings. As examples of the substituents, a $C_1$ to $C_{10}$ alkyl group, $C_1$ to $C_{10}$ alkoxy group, or $C_6$ to $C_{10}$ aryl group may be mentioned. The ring in the case of forming a ring may be any of an aromatic ring or aliphatic ring and hetero ring, but forming an aromatic ring is preferable, forming a $C_6$ to $C_{20}$ aromatic ring is more preferable, and forming a $C_6$ to $C_{10}$ aromatic ring is particularly preferable.

In the general formula (5), $R^9$, $R^{10}$, and $R^{11}$ respectively independently indicate a hydrogen atom; halogen atom; or $C_1$ to $C_{20}$ organic group which may contain a halogen atom, oxygen atom, nitrogen atom, sulfur atom, phosphorus atom, or silicon atom. These groups may be substituted and may bond together to form rings. Further, the specific examples of the $C_1$ to $C_{20}$ organic group which may contain a halogen atom, oxygen atom, nitrogen atom, sulfur atom, phosphorus atom, or silicon atom are the same as the case of the general formulas (1) and (2).

$R^9$, $R^{10}$, and $R^{11}$ are each preferably a hydrogen atom or $C_1$ to $C_{20}$ alkyl group, particularly preferably a hydrogen atom or $C_1$ to $C_3$ alkyl group.

Note that, as the specific examples of the compounds of the general formula (5) and methods of production of the same, for example, the ones described in WO2003/062253 (Japanese Patent Publication No. 2005-515260A) etc. may be mentioned.

The general formula (6) is shown below.

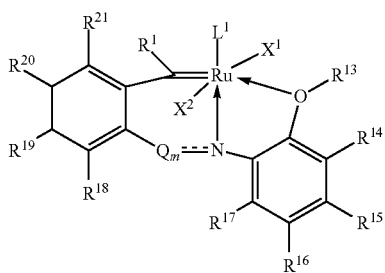

In the general formula (6), m is 0 or 1 and m is preferably 1. In that case, Q is an oxygen atom, nitrogen atom, sulfur atom, methylene group, ethylene group, or carbonyl group, preferably is a methylene group. ---- is a single bond or double bond and preferably is a single bond.

$R^1$, $X^1$, $X^2$, and $L^1$ are the same as the cases of the general formulas (1) and (2) and may respectively independently and/or in any combination bond together to form multi-dendate chelate ligands, but preferably $X^1$, $X^2$, and $L^1$ do not form multi-dendate chelate ligands and $R^1$ is a hydrogen atom.

$R^{13}$ to $R^{21}$ are each a hydrogen atom; halogen atom; or $C_1$ to $C_{20}$ organic group which may contain a halogen atom, oxygen atom, nitrogen atom, sulfur atom, phosphorus atom, or silicon atom. These groups may be substituted and may bond together to form rings. Further, the specific examples of the $C_1$ to $C_{20}$ organic group which may contain a halogen atom, oxygen atom, nitrogen atom, sulfur atom, phosphorus atom, or silicon atom are the same as the case of the general formulas (1) and (2).

$R^{13}$ is preferably a $C_1$ to $C_{20}$ alkyl group, more preferably a $C_1$ to $C_3$ alkyl group, $R^{14}$ to $R^{17}$ are each preferably a hydrogen atom, and $R^{18}$ to $R^{21}$ are each preferably a hydrogen atom or halogen atom.

Note that, as the specific examples of the compounds of the general formula (6) and methods of production of the same, for example, the ones described in WO2011/079799 (Japanese Patent Publication No. 2013-516392A) etc. may be mentioned.

The amount of use of the metathesis polymerization catalyst is usually 0.01 mmole or more with respect to 1 mole of the monomer used for the reaction, preferably 0.1 to 50 mmoles, more preferably 0.1 to 20 mmoles. By making the amount of use of the metathesis polymerization catalyst in the above range, it is possible to balance the reactivity and storage stability of the obtained polymerizable composition to a high level.

(Other Ingredients)

Further, the polymerizable composition of the present invention may contain other ingredients besides the above-mentioned norbornene-based monomers and metathesis polymerization catalysts. As such other ingredients, an activant, polymerization retardant, filler, etc. may be mentioned.

An activant is a compound which acts as a co-catalyst of the above-mentioned metathesis polymerization catalyst and improves the polymerization activity of the above-mentioned metathesis polymerization catalyst. This activant is not particularly limited, but as specific examples, ethyl aluminum dichloride, diethyl aluminum chloride, and other alkyl aluminum halides, alkoxyalkyl aluminum halides, and other organoaluminum compounds; tetrabutyl tin and other organotin compounds; diethyl zinc and other organozinc compounds; dimethyl monochlorosilane, dimethyl dichlorosilane, diphenyl dichlorosilane, tetrachlorosilane, bicycloheptenylmethyl dichlorosilane, phenylmethyl dichlorosilane, dihexyldichlorosilane, phenyltrichlorosilane, methyltrichlorosilane, or other chlorosilane compounds; etc. may be mentioned.

The amount of use of the activant is not particularly limited, but is preferably 0.1 mole or more with respect to 1 mole of metathesis polymerization catalyst, more preferably 1 mole or more. The upper limit of the amount of use is preferably 100 moles or less, more preferably 20 moles or less. If the amount of use of the activant is too small, the polymerization activity becomes too low and the time required for the reaction becomes long, so the production efficiency becomes poor. Conversely, if the amount of use is too great, the reaction ends up becoming too violent and the desired resin shaped article sometimes becomes hard to obtain.

The polymerization retardant, as explained later, is useful for keeping the polymerization from ending up starting during preparation when mixing a monomer solution which contains a norbornene-based monomer and a catalyst solution which contains a metathesis polymerization catalyst to prepare a liquid mixture for a polymerizable composition (below sometimes called a "liquid mixture") and solidifying this by cooling to prepare the polymerizable composition of the present invention. As such a polymerization retardant, phosphines, phosphites, vinyl ether derivatives, ethers, esters, nitrile compounds, pyridine derivatives, alcohols, acetylenes, α-olefins, etc. may be mentioned. Among these as well, from the viewpoints of the high effects as polymerization retardants such that the increase in viscosity of the obtained liquid mixture can be effectively kept down when mixing a norbornene-based monomer and a metathesis polymerization catalyst, phosphines or pyridine derivatives represented by the following formula (7) are particularly preferable.

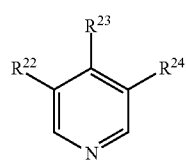

(7)

In the general formula (7), $R^{22}$, $R^{23}$, and $R^{24}$ respectively independently indicate a hydrogen atom or $C_1$ to $C_{10}$ alkyl group which may be substituted or $C_2$ to $C_{10}$ alkenyl group which may be substituted. Further, at least two among $R^{22}$, $R^{23}$, and $R^{24}$ are $C_1$ to $C_{10}$ alkyl groups which may be substituted or $C_2$ to $C_{10}$ alkenyl groups which may be substituted. That is, the pyridine derivative represented by the general formula (7) is a compound where two locations or three locations among the two meta-positions and one para-position (3-position, 4-position, and 5-position) are substituted by $C_1$ to $C_{10}$ alkyl groups which may be substituted or $C_2$ to $C_{10}$ alkenyl groups which may be substituted and the two ortho-positions (2-position and 6-position) are both not substituted (two ortho-positions both have hydrogen atoms bonded to them).

The alkyl group which may be substituted forming the $R^{22}$, $R^{23}$, and $R^{24}$ has 1 to 10 carbon atoms, preferably 1 to 6, more preferably 1 to 4. Further, the alkenyl group which may be substituted usually has 2 to 10 carbon atoms, preferably 2 to 6, more preferably 2 to 4. Note that as the substituents which are introduced to these alkyl groups or alkenyl groups, a halogen atom, hydroxyl group (alcoholic hydroxyl group), —C(=O)—R, —OR, —C(=O)—O—R, or —OC(=O)—R (R is in each case a $C_1$ to $C_{10}$ alkyl group or $C_6$ to $C_{11}$ aryl group) etc. may be mentioned.

The pyridine derivative represented by the general formula (7) may be any of a 2-substituted compound where the two meta-positions are substituted ($R^{22}$ and $R^{24}$ are substituted), 2-substituted compound where one meta-position and para-position are substituted ($R^{22}$ and $R^{23}$ are substituted), or 3-substituted compound where two meta-positions and a para-position are substituted R22, $R^{23}$, and $R^{24}$ are substituted), but from the viewpoint of the effect of addition becoming more remarkable, a 2-substituted compound where the two meta-positions are substituted or a 2-substituted compound where one meta-position and para-position are substituted is preferable.

The amount of use of the polymerization retardant is not particularly limited, but is preferably 15 to 1800 parts by weight with respect to 100 parts by weight of the metathesis polymerization catalyst, more preferably 50 to 900 parts by weight, furthermore preferably 150 to 500 parts by weight.

Note that, the polymerization retardant is suitably used from the viewpoint of process stability not only when using a liquid mixture to prepare a polymerizable composition, but also when using a later explained solid mixture for a polymerizable composition to prepare a polymerizable composition.

The filler is not particularly limited, but, for example, fibrous filler with an aspect ratio of 5 to 100 or granular filler with an aspect ratio of 1 to 2 may be mentioned. Further, these fibrous filler and granular filler may be combined for use.

As specific examples of the fibrous filler, glass fiber, wollastonite, potassium titanate, zonolite, basic magnesium sulfate, aluminum borate, tetrapod type zinc oxide, gypsum fiber, phosphate fiber, alumina fiber, acicular calcium carbonate, acicular boehmite, etc. may be mentioned. Among these as well, from the viewpoint of enabling the rigidity to be raised by a small amount of addition and further preventing obstruction of the bulk polymerization reaction, wollastonite is preferable.

As specific examples of the granular filler, calcium carbonate, calcium hydroxide, calcium silicate, calcium sulfate, aluminum hydroxide, magnesium hydroxide, titanium oxide, zinc oxide, barium titanate, silica, alumina, carbon black, graphite, antimony oxide, red phosphorous, various types of metal powder, clay, various types of ferrite, hydrotalcite, etc. may be mentioned. Among these as well, since they do not obstruct the bulk polymerization reaction, calcium carbonate, silica, alumina, and aluminum hydroxide are preferable.

Further, the above filler is preferably one which is treated to make its surface hydrophobic. By using a filler which is treated to make it hydrophobic, aggregation and precipitation of the filler can be prevented and, further, the filler can be made to uniformly disperse in the bulk polymer of the norbornene-based monomer. As the treatment agent which is used for the hydrophobicity treatment, vinyltrimethoxysilane or other silane coupling agent, a titanate-based coupling agent, aluminate-based coupling agent, stearic acid or other fatty acid, an oil, surfactant agent, wax, etc. may be mentioned. The filler can be treated to make it hydrophobic by, when preparing the mixture for a polymerizable composition as explained later, simultaneously mixing the hydrophobicity treatment agent with the filler, but it is preferable to use a filler which has been treated to make it hydrophobic in advance to prepare the mixture for a polymerizable composition.

In the polymerizable composition of the present invention, the amount of the filler is preferably 10 to 1000 parts by weight with respect to 100 parts by weight of the norbornene-based monomer, more preferably 100 to 500 parts by weight. By making the amount of the filler in the above range, the obtained resin shaped article can be made to be sufficient in strength.

Further, the polymerizable composition of the present invention may contain various types of additives other than the above as well. As such additives, modifiers, antiaging agents, coloring agents, photostabilizers, flame retardants, etc. may be illustrated.

(Preparation of Polymerizable Composition)

The polymerizable composition of the present invention is prepared by preparing a mixture for a polymerizable composition which contains the essential ingredient of the norbornene-based monomer and metathesis polymerization catalyst, and other ingredients which are added as desired such as the activant, polymerization retardant, etc. and solidifying the mixture by cooling.

Note that, in the present invention, if there are several norbornene-based monomers which form the mixture for a polymerizable composition or polymerizable composition, the "freezing point of the norbornene-based monomer" means the value for the mixture of the norbornene-based monomers which are used measured in accordance with JIS K0065.

The mixture for a polymerizable composition can, for example, be prepared by the following two methods.

In the first method, the norbornene-based monomer rendered to be a solid state by cooling down to the freezing point or less in advance, the metathesis polymerization catalyst, and the filler and other ingredients which are added in accordance with desire are cooled down to a temperature where the monomer does not substantially melt while mixing so as to prepare the mixture for a polymerizable composition. In this method, a solid mixture for a polymerizable composition (below, sometimes called a "solid mixture") is obtained.

The form of the solid norbornene-based monomer is not particularly limited so long as enabling handling by the later explained crusher or mixer. As that form, for example, blocks or powder may be mentioned. The blocks of norbornene-based monomer are usually ones of sizes of sides of 50 to 300 mm or so. The powder of norbornene-based monomer is usually one of sizes of an average particle size of 0.2 to 20 mm or so. The average particle size can be measured by the laser diffraction scattering method.

Note that, the solid norbornene-based monomer need only be one which can be handled as a solid at a predetermined temperature. One in a partially melted state is also included.

The metathesis polymerization catalyst may be mixed as a powder or may be mixed as a catalyst solution obtained by dispersing or dissolving it in a solvent.

When mixed as a powder, for example, it may be one where a melting point 40 to 80° C. inert solid is used to coat the metathesis polymerization catalyst in advance. As such an inert solid, for example, paraffin is suitably used. By doing so, the metathesis polymerization catalyst can be improved in stability.

The solvent which is used in the catalyst solution is not particularly limited so long as a solvent which is inert with respect to a metathesis polymerization catalyst, but, for example, toluene, xylene, ethyl benzene, trimethyl benzene, or other aromatic hydrocarbon; methylethyl ketone, cyclopentanone, cyclohexanone, 2-heptanone, 4-hydroxy-4-methyl-2-pentanone, or other ketones; tetrahydrofuran or other cyclic ethers; diethyl ether, dichloromethane, dimethyl sulfoxide, ethyl acetate, etc. may be mentioned. Among these, an aromatic hydrocarbon is preferable, while toluene is particularly preferable.

When using other ingredients, these may be added to the norbornene-based monomer in advance, may be included in the catalyst solution, or may be separately added in the form of mixtures etc. at the time of mixing of the ingredients.

The temperature at the time of mixing of the ingredients is usually a range of temperature lower than the freezing point of the norbornene-based monomer which is used and is preferably made to be a temperature of 5° C. or more lower than the freezing point of the norbornene-based monomer, more preferably a temperature of 10° C. or more lower than the freezing point. If the mixing temperature is in this range, the norbornene-based monomer will substantially not melt, progression of bulk polymerization can be suppressed, and a uniform mixture for a polymerizable composition is efficiently obtained. As the mixing temperature, typically 25° C. or less is suitable.

At the time of mixing the ingredients, it is possible to simultaneously crush the solid norbornene-based monomer or to simply mix the ingredients. In the former case, blocks of norbornene-based monomer are suitably used, while in the latter case, a powder of norbornene-based monomer is suitably used. Further, as the machine which is used for mixing the ingredients, in the former case, a screen cutter, hammer mill, rotary cutter, or other crusher is suitably used, while in the latter case, a Henschel mixer or planetary mixer or other mixer is suitably used. Note that, a ball mill can be used for both cases. The mixing operation may be performed in accordance with a known method and may be performed in one stage or two stages or more. Further, a crusher and mixer may be suitably used combined.

A solid mixture is obtained by the above, but due to the excellent shapeability at the time of solidification by cooling described later, a norbornene-based monomer of a powder state is preferable.

In the second method, a liquid norbornene-based monomer, the metathesis polymerization catalyst, and the filler and other ingredients which are added in accordance with desire are mixed at a temperature where the obtained mixture holds its liquid state so as to prepare the mixture for a polymerizable composition. In this method, a liquid mixture for a polymerizable composition is obtained.

As this method, for example, the method of mixing and stirring into the monomer solution containing the norbornene-based monomer a catalyst solution containing the metathesis polymerization catalyst may be mentioned. The mixing temperature when mixing into the monomer solution containing the norbornene-based monomer a catalyst solution containing the metathesis polymerization catalyst is usually a temperature of the freezing point of the norbornene-based monomer or more and is preferably made to be a range of up to a temperature 10° C. higher than the freezing point of the norbornene-based monomer, more preferably a range of up to a temperature 5° C. higher than the freezing point. If the mixing temperature is in this range, it is possible to substantially suppress the advance of the bulk polymerization of the norbornene-based monomer and efficiently obtain a uniform mixture for a polymerizable composition. The mixing temperature of the monomer solution and the catalyst solution is typically 30 to 60° C., preferably 35° C. to 45° C.

Note that, metathesis polymerization catalyst may also be mixed as a powder.

When using other ingredients, these may be included in either of the monomer solution or catalyst solution or may be separately added in the form of mixtures etc. at the time of mixing of the ingredients.

The mixture for a polymerizable composition can be prepared in the above way, but in a solid mixture, the norbornene-based monomer freezes and loses fluidity. Even if mixed with the metathesis polymerization catalyst, the bulk polymerization will hardly proceed. On the other hand, in a liquid mixture, there is a possibility of bulk polymerization proceeding, so the temperature control has to be performed strictly. Further, the time until solidification by cooling has to be made to be a shorter time. Therefore, because the freedom of operation is high and a mixture for a polymerizable composition can be obtained more stably, the mixture for a polymerizable composition is preferably prepared by the first method.

Next, the obtained mixture for a polymerizable composition is solidified by cooling to obtain the polymerizable composition of the present invention. The method of solidification by cooling is not particularly limited, but, for example, the following method may be mentioned. Note that, in the present invention, "solidification by cooling" means solidifying while cooling.

In the case of a solid mixture, predetermined amounts of it are press formed by a tableting machine or press forming machine while cooling so as to solidify them by cooling to thereby prepare the polymerizable composition of the present invention. The pressure at the time of pressing is not particularly limited, but is usually 10 MPa or so. Note that, as explained later, when producing a resin shaped article, the solid mixture may be directly packed into the shaping mold which is used while cooling and solidified to thereby prepare the polymerizable composition of the present invention in the shaping mold.

In the case of a liquid mixture, before the bulk polymerization of the norbornene-based monomer substantially proceeds, performing solidification by cooling is necessary. For example, when obtaining a liquid mixture, by suitably shaping predetermined amounts of it at a time and immediately solidifying them by cooling, it is possible to prepare the polymerizable composition of the present invention.

Note that, in the above shaping operation, the later explained shaping mold can be used.

The cooling temperature when solidifying the mixture for a polymerizable composition by cooling may be set in accordance with the type of the norbornene-based monomer which is used, but a temperature of 20° C. or more lower than the freezing point of the norbornene-based monomer is preferable and a temperature of 30° C. or more lower is more preferable. As the specific cooling temperature, −60 to 0° C. is preferable and −40 to −10° C. is more preferable. By making the cooling temperature in the above range, it is possible to suitably make the bulk polymerization of the norbornene-based monomer stop. Further, by again heating etc., it is possible to make the reactivity when starting the bulk polymerization of the norbornene-based monomer sufficient and stable.

In the present invention, from the viewpoint of eliminating material loss and raising the production efficiency of the resin shaped article, the mixture for a polymerizable composition is preferably prepared by considering the required amount of the mixture and using the optimum amounts whereby these can be immediately and sufficiently mixed, when mixing the norbornene-based monomer and the metathesis polymerization catalyst. In particular, when preparing a liquid mixture, for example, it is possible to prepare the liquids which have similar viscosities to the monomer solution and catalyst solution used respectively, and suitably determine the optimum amounts of the monomer solution and catalyst solution by confirming the mixabilities of these.

When solidifying by cooling the mixture for a polymerizable composition obtained by mixing the norbornene-based monomer and metathesis polymerization catalyst, before solidifying it by cooling, it is preferable to weigh the materials to give weights corresponding to the shaped article to be produced in advance and obtain cooled solids of weights corresponding to the shaped article to be produced in advance. At this time, it is possible to obtain cooled solids of the same weights as the shaped articles to be produced or obtain a plurality of cooled solids corresponding to the shaped article to be produced.

(Method of Production of Resin Shaped Article)

The method of production of the resin shaped article of the present invention is provided with a step of bulk polymerizing the above-mentioned polymerizable composition of the present invention and thereby obtains a resin shaped article.

In the present invention, when causing bulk polymerization of the above-mentioned polymerizable composition of the present invention to obtain a resin shaped article, usually a shaping mold corresponding to the desired shape is used and the polymerizable composition in the form of the cooled solid is heated in the shaping mold to cause bulk polymerization and thereby a resin shaped article which has the desired shape can be obtained.

The shaping mold is not particularly limited, but, for example, it is possible to use a mold which is formed by a male mold and a female mold. Further, the mold used does not have to be an expensive mold with a high rigidity. It is not limited to a mold made of metal. A mold made of plastic or a simple frame may be used. The material when using a mold made of metal is not particularly limited, but steel, aluminum, zinc alloy, nickel, copper, chrome, etc. may be mentioned. The mold may be produced by any method of casting, forging, thermal spraying, electrocasting, etc. Further, it may also be a plated one. The structure of the mold may be determined in consideration of the pressure at the time of injecting the polymerizable composition in the mold. Further, the clamping pressure of the mold is usually a gauge pressure of 0.1 to 9.8 MPa or so.

The mold temperature may be suitably selected in accordance with the type of norbornene-based monomer which is used, but is preferably made to be a temperature of 30° C. or more higher than the freezing point of the norbornene-based monomer and is more preferably made to be a temperature of 50° C. or more higher than the freezing point. Typically, the mold temperature is usually 60 to 160° C., preferably 80 to 120° C. The time of the bulk polymerization may be suitably selected, but is usually 20 seconds to 20 minutes, preferably 20 seconds to 5 minutes after placing the polymerizable composition in the state of a cooled solid in the mold.

When supplying the polymerizable composition in the cavity which is formed by a mold comprised of a male mold and female mold for bulk polymerization, in general the mold temperature $T1$(° C.) of the design surface side mold is set higher than the mold temperature $T2$(° C.) of the opposite side as the design surface. Due to this, it is possible to obtain a shaped article with a beautiful surface appearance free from whiskers or bubbles. $T1-T2$ is preferably 5° C. or more, more preferably 10° C. or more and has an upper limit of preferably 60° C. $T1$ has an upper limit of preferably 110° C., more preferably 95° C., and has a lower limit of preferably 50° C. $T2$ has an upper limit of preferably 70° C., more preferably 60° C., and has a lower limit of preferably 30° C.

As the method of adjusting the mold temperature, for example, adjustment of the mold temperature by a heater; adjustment of the temperature by the warm water, oil, etc. circulating in piping embedded in the mold; etc. may be mentioned.

After the end of the bulk polymerization, for example, the mold is opened and the article removed to obtain the resin shaped article.

The polymerizable composition of the present invention is comprised of a mixture which contains a norbornene-based monomer and a metathesis polymerization catalyst which is solidified by cooling, so is excellent in storage stability without the bulk polymerization of the norbornene-based monomer proceeding. Further, the norbornene-based monomer and the metathesis polymerization catalyst are already in a sufficiently mixed state, so by heating the polymerizable composition of the present invention to melt and causing it to polymerize and cure, a small resin shaped article which is excellent in stability of quality can be efficiently produced on an industrial scale. According to the present invention, at the stage of preparing the polymerizable composition, the norbornene-based monomer and the metathesis polymerization catalyst can be uniformly mixed and the obtained mixture can be weighed to a weight corresponding to a desired resin shaped article and this is cooled to solidify, so by causing the obtained polymerizable composition to bulk polymerize, it is possible to realize excellent stability of quality even when obtaining a small resin shaped article (for example, when obtaining a shaped article with a weight of less than 100 g).

EXAMPLES

Below, examples and comparative examples will be mentioned to specifically explain the present invention. Below, unless otherwise specially indicated, "parts" are based on weight. Note that, the tests and evaluations may based on the following.

(1) Curing Time

According to the method which is shown in the examples and comparative examples, the polymerizable composition was placed on a mold warmed to a predetermined temperature, then the time until the polymerizable composition as a whole was cured (unit: minutes) was measured. This was defined as the curing time.

(2) Mold Cleaning Frequency

According to the method which is shown in the examples and comparative examples, sample sheets were formed and the obtained sample sheets were taken out from the mold. This work was repeated and the number of times until the sample sheets became poor in release and deformed or broke and thereby mold cleaning became required was measured. The value was measured as the mold cleaning frequency.

(3) Measurement of Glass Transition Temperature (Tg)

According to the method which is shown in the examples and comparative examples, sample sheets were formed and the obtained sample sheets were processed to sizes of φ3×1 mm. For the samples made to be φ3×1 mm in size, a differential scan calorimeter (DSC-6220, made by Seiko Instruments) was used to measure the DSC curve by a temperature elevation rate of 10° C./min from 30° C. to 220° C.

Further, from the obtained DSC curve, the value of the intersection of the line obtained by extending the base line at the low temperature side from the inflection point and the line obtained by extending the base line at the high temperature side from the inflection point was read. This was regarded as the glass transition temperature (Tg).

Example 1

(Preparation of Catalyst Solution)

A metathesis polymerization catalyst constituted by a ruthenium catalyst shown by the following formula (8) (VC843, made by Strem Chemicals) 0.6 part and 2,6-di-t-butyl-p-cresol (BHT, antiaging agent) 15 parts were dissolved in cyclopentanone 82 parts, then this was mixed with 3,4-dimethylpyridine 2.2 parts and phenyltrichlorosilane 0.1 part to obtain a catalyst solution.

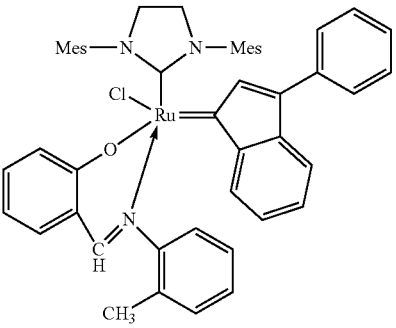

(8)

(Formation of Sample Sheets)

To dicyclopentadiene 100 parts warmed to 40° C., triphenylphosphine 0.5 part and the above prepared catalyst solution 3.3 parts were added. These were mixed to prepare a mixture for a polymerizable composition. The obtained mixture for a polymerizable composition was divided into amounts of 100 g, 50 g, and 10 g. Further, quickly after that, the divided polymerizable composition was rapidly cooled down to −20° C. to thereby obtain a polymerizable composition in the cooled solidified state.

Further, separate from the above, as a mold, an aluminum female mold which has inside it a cavity of a vertical 250 mm×horizontal 200 mm×thickness 4 mm was prepared and warmed to 70° C. After that, the above obtained cooled solid samples of the polymerizable composition (samples of polymerizable composition divided into 100 g, 50 g, and 10 g) were placed on the mold and bulk polymerization started. Further, in accordance with the above method, the curing time was measured, then the shaped articles were taken out from the mold after the elapse of a predetermined time after finishing curing to obtain the sample sheets. Further, the obtained sample sheets were measured for glass transition temperature (Tg) in accordance with the above-mentioned methods. Further, after that, sample sheets were repeatedly shaped and taken out from the mold and the mold cleaning frequency was measured in accordance with the above-mentioned method. The results are shown in Table 1.

Example 2

Except for using, instead of dicyclopentadiene, tetracyclododecene, the same procedure was followed as in Example 1 to obtain a polymerizable composition in the state of a cooled solid and sample sheets and the same procedure was followed to evaluate them. The results are shown in Table 1.

Example 3

Except for using, instead of dicyclopentadiene, ethylidene tetracyclododecene, the same procedure was followed as in Example 1 to obtain a polymerizable composition in the state of a cooled solid and sample sheets and the same procedure was followed to evaluate them. The results are shown in Table 1.

Example 4

Except for, when obtaining the mixture for a polymerizable composition, further adding aluminum hydroxide 150 parts with respect to dicyclopentadiene 100 parts, the same procedure was followed as in Example 1 to obtain a polymerizable composition in the state of a cooled solid and sample sheets and the same procedure was followed to evaluate them. The results are shown in Table 1.

Example 5

Except for making the mold temperature 40° C., the same procedure was followed as in Example 1 to obtain sample sheets and the same procedure was followed to evaluate it. The results are shown in Table 1.

Example 6

To dicyclopentadiene 100 parts warmed to 40° C., triphenylphosphine 0.5 part was dissolved. The solution was rapidly cooled down to −20° C. to obtain a solid monomer composition.

Next, the above monomer composition was charged in that state in 100 parts into a planetary mixer with a tank held at 15° C., then a catalyst solution 3.3 parts prepared in the same way as Example 1 was charged and mixed for 10 minutes to obtain a mixture for a polymerizable composition. The mixture was divided into smaller amounts of 100 g, 50 g, and 10 g which were rapidly cooled down to −20° C. and press formed to obtain polymerizable composition. The obtained polymerizable composition was processed in the same way as in Example 1 to obtain sample sheets and the same procedure was followed to evaluate them. The results are shown in Table 1.

Example 7

(Preparation of Catalyst Solution)

A metathesis polymerization catalyst constituted by the ruthenium catalyst shown in the following formula (9) (Zhan 1N) 0.6 part and BHT 15 parts were dissolved in cyclopentadiene 82 parts to obtain a catalyst solution.

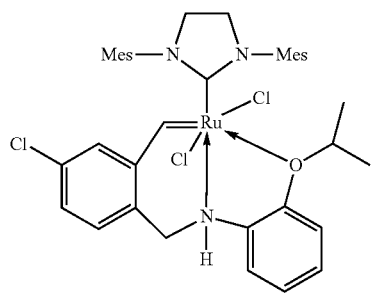

(9)

(Formation of Sample Sheets)

A catalyst solution obtained above was used and the same procedure as in Example 1 was followed to obtain a polymerizable composition in the state of a cooled solid and sample sheets and the same procedure was followed to evaluate them. The results are shown in Table 1.

Example 8

Except for changing the used catalyst solution to a catalyst solution which is prepared in the same way as in Example 7, the same procedure was followed as in Example 6 to obtain a polymerizable composition and sample sheets and the same procedure was followed to evaluate them. The results are shown in Table 1.

Comparative Example 1

Except for using a high ratio collisional mixing type RIM machine and mixing a catalyst solution 3.3 parts prepared in the same way as in Example 1 and a monomer solution 100.5 parts comprised of dicyclopentadiene 100 parts and triphenylphosphine 0.5 part by collisional mixing at discharge speeds of 100 g/s, 50 g/s, and 10 g/s and directly discharging the obtained mixtures 100 g, 50 g, and 10 g into the same molds as those of Example 1, the same procedure was followed as in Example 1 to obtain sample sheets and the same procedure was followed to evaluate them. The results are shown in Table 2.

Comparative Example 2

Except for using, instead of dicyclopentadiene, tetracyclododecene, the same procedure was followed as in Comparative Example 1 to obtain sample sheets and the same procedure was followed to evaluate them. The results are shown in Table 2.

Comparative Example 3

Except for using, as the monomer solution, a monomer solution 250.5 parts comprised of dicyclopentadiene 100 parts, triphenylphosphine 0.5 part, and aluminum hydroxide 150 parts, the same procedure was followed as in Comparative Example 1 to obtain sample sheets and the same procedure was followed to evaluate them. The results are shown in Table 2.

TABLE 1

| | Example 1 | | | Example 2 | | | Example 3 | | | Example 4 | | |
|---|---|---|---|---|---|---|---|---|---|---|---|---|
| Weight of polymerizable composition in state of cooled solid (g) | Curing time (min) | Mold cleaning frequency | Glass transition temp. (° C.) | Curing time (min) | Mold cleaning frequency | Glass transition temp. (° C.) | Curing time (min) | Mold cleaning frequency | Glass transition temp. (° C.) | Curing time (min) | Mold cleaning frequency | Glass transition temp. (° C.) |
| 100 | 3 | >40 | 155 | 3 | >40 | 180 | 3 | >40 | 180 | 3 | >40 | 110 |
| 50 | 3 | >40 | 155 | 3 | >40 | 180 | 3 | >40 | 180 | 3 | >40 | 110 |
| 10 | 3 | >40 | 145 | 3 | >40 | 175 | 3 | >40 | 170 | 3 | >40 | 100 |

TABLE 1-continued

Table 1

| Weight of polymerizable composition in state of cooled solid (g) | Example 5 | | | Example 6 | | | Example 7 | | | Example 8 | | |
|---|---|---|---|---|---|---|---|---|---|---|---|---|
| | Curing time (min) | Mold cleaning frequency | Glass transition temp. (° C.) | Curing time (min) | Mold cleaning frequency | Glass transition temp. (° C.) | Curing time (min) | Mold cleaning frequency | Glass transition temp. (° C.) | Curing time (min) | Mold cleaning frequency | Glass transition temp. (° C.) |
| 100 | 15 | >40 | 130 | 3 | >40 | 155 | 3 | >40 | 160 | 3 | >40 | 160 |
| 50 | 15 | 30 | 130 | 3 | >40 | 155 | 3 | >40 | 160 | 3 | >40 | 160 |
| 10 | 20 | 20 | 120 | 3 | >40 | 145 | 3 | >40 | 155 | 3 | >40 | 155 |

TABLE 2

Table 2

| Discharged amount of collisional mixture (g/s) | Comparative Example 1 | | | Comparative Example 2 | | | Comparative Example 3 | | |
|---|---|---|---|---|---|---|---|---|---|
| | Curing time (min) | Mold cleaning frequency | Glass transition temp. (° C.) | Curing time (min) | Mold cleaning frequency | Glass transition temp. (° C.) | Curing time (min) | Mold cleaning frequency | Glass transition temp. (° C.) |
| 100 | 5 | 40 | 150 | 3 | 30 | 180 | 3 | 30 | 110 |
| 50 | 15 | 1 | Undetectable | 15 | 1 | Undetectable | 20 | 1 | Undetectable |
| 10 | Not yet reacted | 1 | Not measurable | Not yet reacted | 1 | Not measurable | Not yet reacted | 1 | Not measurable |

As shown in Table 1, in Examples 1 to 8 using polymerization compositions in the state of cold solids as defined in the present invention, in addition to when forming 100 g resin shaped articles, when forming 50 g and 10 g small shaped articles as well, good shaped articles which have glass transition temperatures of the same extent as the case of forming 100 g resin shaped articles could be obtained. Further, in Examples 1 to 8, it could be confirmed that the mold cleaning frequency, that is, the number of times after which imperfect shaped articles ended up being obtained and due to this the releasability from the mold was poor, deformation and breakage occurred, and therefore mold cleaning became necessary, was excellent for each of 100 g, 50 g, and 10 g resin shaped articles and in each case, suitable shaped articles could be continuously obtained.

On the other hand, as shown in Table 2, in Comparative Examples 1 to 3 where, in the same way as the past, a high ratio collisional mixing type RIM machine is used to cause collisional mixing of the catalyst solution and the monomer solution and the obtained mixture is used to obtain a resin shaped article, relatively good results could be obtained for 100 g resin shaped articles, but resin shaped articles could not be obtained when forming small resin shaped articles of 50 g and 10 g or, even if resin shaped articles could be obtained, the glass transition temperatures could not be detected and imperfect shaped articles resulted. Further, in Comparative Examples 1 to 3, when forming 50 g and 10 g small resin shaped articles, resin shaped articles could not be obtained or only imperfect shaped articles could be obtained, so the mold had to be cleaned after a single molding operation.

The invention claimed is:

1. A polymerizable composition comprised of a mixture of a norbornene-based monomer and a metathesis polymerization catalyst which is solidified by cooling; wherein the polymerizable composition is in the solid state, and the metathesis polymerization catalyst is a compound represented by a following general formula (5) or a compound represented by a following general formula (6):

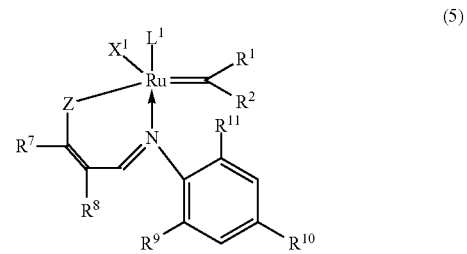

(5)

wherein, in the general formula (5), Z indicates an oxygen atom, sulfur atom, selenium atom, $NR^{12}$, $PR^{12}$, or $AsR^{12}$, $R^{12}$ indicates a hydrogen atom; halogen atom; or $C_1$ to $C_{20}$ organic group which may contain a halogen atom, oxygen atom, nitrogen atom, sulfur atom, phosphorus atom, or silicon atom, $R^1$ and $R^2$ respectively independently indicate a hydrogen atom; halogen atom; or $C_1$ to $C_{20}$ organic group which may contain a halogen atom, oxygen atom, nitrogen atom, sulfur atom, phosphorus atom or silicon atom, where the organic groups which form $R^1$ and $R^2$ may be substituted, or may bond together to form a ring, $X^1$ indicates an anionic ligand, $L^1$ indicates a hetero atom-containing carbene compound or a neutral electron donor compound other than a hetero atom-containing carbene compound, and $R^7$ and $R^8$ respectively independently indicate a hydrogen atom, $C_1$ to $C_{20}$ alkyl group, $C_2$ to $C_{20}$ alkenyl group, or $C_6$ to $C_{20}$ heteroaryl group, where the alkyl group, alkenyl group, and heteroaryl group which form $R^7$ and $R^8$ may be substituted, or may bond together to form a ring, $R^9$, $R^{10}$, and $R^{11}$ respectively independently indicate a hydrogen atom; halogen atom; or $C_1$ to $C_{20}$ organic group which may contain a halogen atom, oxygen atom, nitrogen atom, sulfur atom, phosphorus atom, or silicon atom, where the organic groups which form $R^9$, $R^{10}$, and $R^{11}$ may be substituted, or may bond together to form a ring, and $R^1$, $R^2$, $X^1$, and $L^1$ may respectively bond together in any combination to form a multi-dendate chelate ligand,

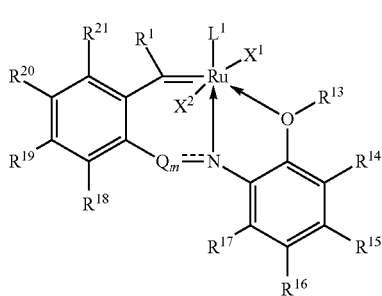

(6)

wherein, in the general formula (6), m is 0 or 1,

Q is an oxygen atom, nitrogen atom, sulfur atom, methylene group, ethylene group, or carbonyl group, ---- is a single bond or double bond, $R^1$ indicates a hydrogen atom; halogen atom; or $C_1$ to $C_{20}$ organic group which may contain a halogen atom, oxygen atom, nitrogen atom, sulfur atom, phosphorus atom or silicon atom, where the organic group which forms $R^1$ may be substituted, $X^1$ and $X^2$ respectively independently indicate an anionic ligand, $L^1$ indicates a hetero atom-containing carbene compound or a neutral electron donor compound other than a hetero atom-containing carbene compound, and $R^{13}$ to $R^{21}$ are each a hydrogen atom; halogen atom; or $C_1$ to $C_{20}$ organic group which may contain a halogen atom, oxygen atom, nitrogen atom, sulfur atom, phosphorus atom, or silicon atom, where the organic groups which form $R^{13}$ to $R^{21}$ may be substituted, or may bond together to form a ring, and $R^1$, $X^1$, $X^2$, and $L^1$ may respectively bond together in any combination to form a multi-dendate chelate ligand.

2. The polymerizable composition as set forth in claim 1 wherein the norbornene-based monomer has a freezing point of 20° C. or more.

3. The polymerizable composition as set forth in claim 1 wherein a cooling temperature at the time of the solidification by cooling is made to be a temperature of 20° C. or more lower than a freezing point of the norbornene-based monomer.

4. The polymerizable composition as set forth in claim 2 wherein a cooling temperature at the time of the solidification by cooling is made to be a temperature of 20° C. or more lower than a freezing point of the norbornene-based monomer.

5. A method of production of a resin shaped article comprising a step of bulk polymerizing the polymerizable composition as set forth in claim 1.

* * * * *